United States Patent
Li et al.

(10) Patent No.: US 12,460,187 B2
(45) Date of Patent: Nov. 4, 2025

(54) FUMONISIN DEGRADING ENZYME FumDPS AND GENE AND USE THEREOF

(71) Applicant: TIANJIN UNIVERSITY OF SCIENCE & TECHNOLOGY, Tianjin (CN)

(72) Inventors: Zhongyuan Li, Tianjin (CN); Tongcun Zhang, Tianjin (CN); Junqi Zhao, Tianjin (CN); Huihui Liu, Tianjin (CN)

(*) Notice: Subject to any disclaimer, the term of this patent is extended or adjusted under 35 U.S.C. 154(b) by 870 days.

(21) Appl. No.: 17/283,562

(22) PCT Filed: Sep. 29, 2019

(86) PCT No.: PCT/CN2019/108923
§ 371 (c)(1),
(2) Date: Apr. 8, 2021

(87) PCT Pub. No.: WO2020/073845
PCT Pub. Date: Apr. 16, 2020

(65) Prior Publication Data
US 2021/0340510 A1    Nov. 4, 2021

(30) Foreign Application Priority Data
Oct. 9, 2018 (CN) .......................... 201811171693.5

(51) Int. Cl.
*C12N 9/18* (2006.01)
*A23K 20/189* (2016.01)
*A23L 29/00* (2016.01)

(52) U.S. Cl.
CPC .............. *C12N 9/18* (2013.01); *A23K 20/189* (2016.05); *A23L 29/06* (2016.08); *C12Y 301/01087* (2013.01); *A23V 2002/00* (2013.01)

(58) Field of Classification Search
CPC ........ C12N 9/18; C12N 15/70; A23K 20/189; A23K 10/14; A23L 29/06; A23L 33/17; A23L 33/10; C12Y 301/01087; A23V 2002/00
See application file for complete search history.

(56) References Cited

U.S. PATENT DOCUMENTS

| 6,388,171 B1 | 5/2002 | Duvick et al. |
| 6,538,177 B1 * | 3/2003 | Duvick .............. C12N 15/8282 536/23.6 |

FOREIGN PATENT DOCUMENTS

| CN | 108251385 A | 7/2018 |
| CN | 108251399 A | 7/2018 |
| CN | 108251405 A | 7/2018 |
| CN | 109439639 A | 3/2019 |
| WO | 2000004159 A1 | 1/2000 |

OTHER PUBLICATIONS

Database Genbank Jun. 9, 2017 (Jun. 9, 2017), "hypothetical protein CDO46_07790 [*Pigmentiphaga* sp. NML030171]", Database accession No. OVZ65271.1 (Year: 2017).*
Database Genbank Jun. 12, 2017 (Jun. 12, 2017), "para-nitrobenzyl esterase PnbA [*Pigmentiphaga* sp. NML030171", Database accession No. WP_087837956.1 (Year: 2017).*
ISR: China National Intellectual Property Admin; Jan. 7, 2020.
"Para-Nitrobenzyl Esterase PNBA;" Genbank; Jun. 12, 2017.
Research on the Degradation of Fumonisins by a Carboxylesterase; Tingting et al; 2018.
Degradation of Fumonisin B1 by the Consecutive Action of Two Bacterial Enzymes; Heinl et al; Journal of Biotechnology; 2010.
China Search Report; Sep. 24, 2020.

* cited by examiner

*Primary Examiner* — Sean C. Barron
(74) *Attorney, Agent, or Firm* — Patshegen IP; Moshe Pinchas (57) ABSTRACT

The present invention relates to the field of genetic engineering, particularly to a fumonisin degrading enzyme FumDPS, gene and application thereof. The present invention provides a fumonisin degrading enzyme FumDPS from *Pigmentiphaga* sp. which has the amino acid sequence of SEQ ID NO: 1, has the optimum temperature of 37° C., and the optimum pH of 8 to 9, remains more than 60% of the activity in the range of pH 3 to 7, and has 100% of degradation rate of fumonisin B1 at the optimum temperature and pH. The enzyme of the present invention can be applied to reduce the harm of fumonisin to animals and human health in agriculture, feed and food.

5 Claims, 2 Drawing Sheets
Specification includes a Sequence Listing.

```
                        SEQUENCE LISTING

<160> NUMBER OF SEQ ID NOS: 4

<210> SEQ ID NO 1
<211> LENGTH: 552
<212> TYPE: PRT
<213> ORGANISM: Artificial Sequence
<220> FEATURE:
<223> OTHER INFORMATION: synthesized protein

<400> SEQUENCE: 1

Met His Ser Leu Asn Ser Ser Met Glu His Trp Ser Ala Met Ser Glu
1               5                   10                  15

Arg Gln Ser Ile Thr Val Arg Arg Leu Arg Ile Gly Gly Gln Val
            20                  25                  30

Leu Cys Ala Ala Leu Leu Gly Ala Ala Met Ala Gly Cys Gly Ser Asp
                35                  40                  45

Gly Ala Lys Ala Pro Glu Ala Gly Ser Pro Gly Gly Asn Pro Pro Gly
    50                  55                  60

Glu Pro Leu Pro Pro Gly Ile Ala Arg Thr Ser Ala Gly Leu Val Arg
65                  70                  75                  80

Gly Asp Val Gly Glu Ile Val Ser Phe Lys Gly Ile Pro Tyr Ala Arg
                85                  90                  95

Pro Pro Val Gly Asp Leu Arg Trp Arg Pro Ala Asp Ala Glu Pro
            100                 105                 110

Trp Glu Gly Val Arg Asp Ala Leu Ala Phe Gly Pro Ala Cys Ile Gln
        115                 120                 125

Ala Gly Ser Arg Val Gln Ser Glu Asp Cys Leu Thr Leu Asn Val Trp
    130                 135                 140

Val Pro Arg Glu Ser Leu Asp Arg Gly Glu Lys Leu Pro Val Leu Val
145                 150                 155                 160

Trp Val Tyr Gly Gly Ser Phe Val Gly Gly Ser Gly Asp Phe Glu Ala
                165                 170                 175

Glu Gly Leu Ala Arg Lys Gly Ala Val Val Val Ser Met Asn Tyr Arg
            180                 185                 190

Val Ser Thr Met Gly Phe Met Ala His Pro Gly Leu Ser Ala Glu Ser
        195                 200                 205

Pro Glu Gly Thr Ser Gly Asn Tyr Gly Leu Leu Asp Ile Ala Gln Ser
    210                 215                 220

Leu Lys Trp Val Arg Lys Asn Ile Ala Asn Phe Gly Gly Asp Ala Gly
225                 230                 235                 240

Arg Val Thr Val Trp Gly Gln Ser Ser Gly Ala Ser Ala Ile Thr Ala
                245                 250                 255

Leu Met Val Ser Pro Arg Ser Asp Gly Leu Phe Asp Gln Val Ile Leu
            260                 265                 270

Asp Ser Pro Gly Ala Met Arg His Trp Lys Thr Leu Ala Glu Ala Glu
        275                 280                 285

Gln Asp Gly Ile Ala Ile Gly Ser Asp Ile Gly Gln Leu Arg Lys Leu
    290                 295                 300

Pro Ala Asp Gln Val Pro Val Ile Gln Asn Thr Gly Gly Gly Thr Ala
305                 310                 315                 320
```

```
Val Arg Ala Leu Ala Glu Pro Arg Val Ile Gly Pro Val Leu Asp Gly
            325                 330                 335

Val Val Leu Pro Leu Glu Glu Arg Pro Ala Phe Glu Arg Gly Gln Ala
            340                 345                 350

Arg Ala Val Pro Val Leu Val Gly Tyr Asn Thr Asp Glu Gly Ala Ser
            355                 360                 365

Phe Thr Gly Gly Tyr Gln Ile Arg Thr Val Asp Ala Tyr Arg Ala Tyr
            370                 375                 380

Leu Lys Asp Pro Lys Ile Phe Ala Glu Phe Asp Glu Ala Phe Ser
385                 390                 395                 400

Tyr Tyr Pro Val Ser Ser Asp Ser Glu Val Gln Arg Ala Ile Ser Asp
            405                 410                 415

Ser Phe Gly Asp Asn Gln Phe Val Phe Gly Thr Arg Gly Ile Ala Arg
            420                 425                 430

Ala Met Ala Ala Gln Gly Gln Pro Val Tyr Arg Tyr Trp Phe Arg Arg
            435                 440                 445

Lys Gly Asn Gly Gly Thr Gly Ala Asp Ala Val His Gly Ala Glu Leu
            450                 455                 460

Pro Tyr Val Arg Ala Asp Ala Arg Leu Asp Ala Ala Pro Tyr Thr Ala
465                 470                 475                 480

Asp Asp Val Lys Leu Ser Arg Met Met Asn Asp Ala Trp Phe Arg Phe
            485                 490                 495

Val Ser Thr Gly Asp Pro Asn Gly Gly Glu Val Thr Asn Trp Pro Arg
            500                 505                 510

Tyr Asp Thr Arg Ser Glu Pro Val Tyr Val Phe Asp Ala Ala Thr Glu
            515                 520                 525

Ile Val Asn Gly Pro Arg Asn Asp Arg Leu Asp Phe Ile Gly Arg Val
            530                 535                 540

Asp Ala Ala Leu Asn Pro Val Pro
545                 550

<210> SEQ ID NO 2
<211> LENGTH: 498
<212> TYPE: PRT
<213> ORGANISM: Artificial Sequence
<220> FEATURE:
<223> OTHER INFORMATION: synthesized protein

<400> SEQUENCE: 2

Ala Gly Ser Pro Gly Gly Asn Pro Pro Gly Glu Pro Leu Pro Pro Gly
1               5                   10                  15

Ile Ala Arg Thr Ser Ala Gly Leu Val Arg Gly Asp Val Gly Glu Ile
            20                  25                  30

Val Ser Phe Lys Gly Ile Pro Tyr Ala Arg Pro Pro Val Gly Asp Leu
            35                  40                  45

Arg Trp Arg Pro Pro Ala Asp Ala Glu Pro Trp Glu Gly Val Arg Asp
        50                  55                  60

Ala Leu Ala Phe Gly Pro Ala Cys Ile Gln Ala Gly Ser Arg Val Gln
65              70                  75                  80

Ser Glu Asp Cys Leu Thr Leu Asn Val Trp Val Pro Arg Glu Ser Leu
            85                  90                  95

Asp Arg Gly Glu Lys Leu Pro Val Leu Val Trp Val Tyr Gly Gly Ser
            100                 105                 110

Phe Val Gly Gly Ser Gly Asp Phe Glu Ala Glu Gly Leu Ala Arg Lys
            115                 120                 125
```

Gly Ala Val Val Ser Met Asn Tyr Arg Val Ser Thr Met Gly Phe
130                 135                 140

Met Ala His Pro Gly Leu Ser Ala Glu Ser Pro Glu Gly Thr Ser Gly
145                 150                 155                 160

Asn Tyr Gly Leu Leu Asp Ile Ala Gln Ser Leu Lys Trp Val Arg Lys
                165                 170                 175

Asn Ile Ala Asn Phe Gly Gly Asp Ala Gly Arg Val Thr Val Trp Gly
            180                 185                 190

Gln Ser Ser Gly Ala Ser Ala Ile Thr Ala Leu Met Val Ser Pro Arg
        195                 200                 205

Ser Asp Gly Leu Phe Asp Gln Val Ile Leu Asp Ser Pro Gly Ala Met
210                 215                 220

Arg His Trp Lys Thr Leu Ala Glu Ala Glu Gln Asp Gly Ile Ala Ile
225                 230                 235                 240

Gly Ser Asp Ile Gly Gln Leu Arg Lys Leu Pro Ala Asp Gln Val Pro
                245                 250                 255

Val Ile Gln Asn Thr Gly Gly Thr Ala Val Arg Ala Leu Ala Glu
            260                 265                 270

Pro Arg Val Ile Gly Pro Val Leu Asp Gly Val Val Leu Pro Leu Glu
        275                 280                 285

Glu Arg Pro Ala Phe Glu Arg Gly Gln Ala Arg Ala Val Pro Val Leu
290                 295                 300

Val Gly Tyr Asn Thr Asp Glu Gly Ala Ser Phe Thr Gly Gly Tyr Gln
305                 310                 315                 320

Ile Arg Thr Val Asp Ala Tyr Arg Ala Tyr Leu Lys Asp Pro Lys Ile
                325                 330                 335

Phe Ala Glu Phe Gly Asp Glu Ala Phe Ser Tyr Tyr Pro Val Ser Ser
            340                 345                 350

Asp Ser Glu Val Gln Arg Ala Ile Ser Asp Ser Phe Gly Asp Asn Gln
        355                 360                 365

Phe Val Phe Gly Thr Arg Gly Ile Ala Arg Ala Met Ala Ala Gln Gly
370                 375                 380

Gln Pro Val Tyr Arg Tyr Trp Phe Arg Arg Lys Gly Asn Gly Gly Thr
385                 390                 395                 400

Gly Ala Asp Ala Val His Gly Ala Glu Leu Pro Tyr Val Arg Ala Asp
                405                 410                 415

Ala Arg Leu Asp Ala Ala Pro Tyr Thr Ala Asp Asp Val Lys Leu Ser
            420                 425                 430

Arg Met Met Asn Asp Ala Trp Phe Arg Phe Val Ser Thr Gly Asp Pro
        435                 440                 445

Asn Gly Gly Glu Val Thr Asn Trp Pro Arg Tyr Asp Thr Arg Ser Glu
450                 455                 460

Pro Val Tyr Val Phe Asp Ala Ala Thr Glu Ile Val Asn Gly Pro Arg
465                 470                 475                 480

Asn Asp Arg Leu Asp Phe Ile Gly Arg Val Asp Ala Ala Leu Asn Pro
                485                 490                 495

Val Pro

<210> SEQ ID NO 3
<211> LENGTH: 1659
<212> TYPE: DNA
<213> ORGANISM: Artificial Sequence
<220> FEATURE:
<223> OTHER INFORMATION: synthesized gene

<400> SEQUENCE: 3

```
atgcattcct taaactcgtc gatggagcat tggtcggcca tgtctgaacg ccagtccata      60
accgtgcgtc gccgcctgcg tatcggcggc caagtcctct gcgccgcatt gctgggcgct     120
gccatggcgg gatgcggcag cgatggcgcc aaggcccccg aggctggaag tcccggaggc     180
aatccgccgg gcgaaccect tccgcctggc attgcgcgta cctctgccgg cctggtcagg     240
ggcgatgtgg gagagatcgt gtctttcaag ggaatcccgt atgccaggcc gcccgtcggc     300
gacttgcggt ggcgcccgcc ggccgatgcc gaaccgtggg agggcgtgcg ggatgccttg     360
gcgttcggcc cggcatgcat ccaggccggc tcgagggtcc agagcgaaga ctgcctgacg     420
ctgaacgtct gggtaccgcg cgagtccctg gaccggggcg agaaactgcc ggtgctggtc     480
tgggtgtacg gtggaagctt tgtcggcggc tccggagact cgaggccgga ggggctggct     540
cgcaagggg cggtggtggt gtcgatgaac taccgcgtca gtacgatggg cttcatggcc      600
cacccggggt tgtcgccga atcgccgaa ggcacctcgg gcaattacgg tctgctcgac       660
atcgcgcagt ccctcaaatg ggtacgcaag aacatcgcga acttcggcgg cgatgcgggg    720
cgggtcacgg tgtgggggca gtcgtcaggc gccagcgcca tcaccgcgtt gatggtttcc     780
ccccgatcgg atggcttgtt cgaccaggtc atcctcgaca gtccgggcgc gatgcggcat     840
tggaagacgc tggccgaggc ggagcaggac ggtatcgcga tcgggtccga tatcggccag     900
ttgcgcaagc tgcccgcgga ccaggttccc gtcatccaga ataccggcgg cggcacggcg     960
gttcgggcgc tggccgagcc ccgggtgatc ggtcccgtgc tggacggggt ggtgcttccg    1020
cttgaggagc ggcccgcatt cgagcggggg caggcgcggg cggtgccggt cctggttggg    1080
tacaacaccg atgaagggc gtcgttcacc ggggggatacc agatccgtac cgtggatgcc    1140
tatcgggcgt atctcaagga tccgaagata ttcgcggagt cggcgacga ggccttctcc     1200
tattacccgg tctccagcga tagcgaggtg caacgggcga tttccgacag ctttggcgac    1260
aaccagttcg tgttcggcac ccgggggcatt gccaggcga tggccgcgca ggggcagccg    1320
gtatatcgct attggttccg caggaagggt aacggcggaa ccgcgcgga cgccgtgcat     1380
ggcgccgagt tgccctatgt ccgggccgac gcgaggctcg atgccgcgcc gtacaccgcg    1440
gacgacgtga aactgtcccg catgatgaac gatgcctggt ttcgcttcgt ctcgaccgga    1500
gacccgaacg tggcgaggt cacgaactgg ccccggtacg acacgcgctc cgaaccggta     1560
tacgtcttcg acgcggcgac ggaaatcgtg aacggtccgc gcaatgatcg attggatttc    1620
atcggcaggg tcgacgccgc gctgaatccg gtcccgtag                           1659
```

<210> SEQ ID NO 4
<211> LENGTH: 1494
<212> TYPE: DNA
<213> ORGANISM: Artificial Sequence
<220> FEATURE:
<223> OTHER INFORMATION: synthesized gene

<400> SEQUENCE: 4

```
gctggaagtc ccggaggcaa tccgccgggc gaacccette cgcctggcat tgcgcgtacc      60
tctgccggcc tggtcagggg cgatgtggga gagatcgtgt ctttcaaggg aatcccgtat    120
gccaggccgc ccgtcggcga cttgcggtgg cgcccgccgg ccgatgccga accgtgggag    180
ggcgtgcggg atgccttggc gttcggcccg gcatgcatcc aggccggctc gagggtccag    240
agcgaagact gcctgacgct gaacgtctgg gtaccgcgcg agtccctgga ccggggcgag    300
aaactgccgg tgctggtctg ggtgtacggt ggaagctttg tcggcggctc cggagacttc    360
```

-continued

```
gaggccgagg ggctggctcg caaggggcg gtggtggtgt cgatgaacta ccgcgtcagt    420
acgatgggct tcatggccca cccggggttg tcggccgaat cgccggaagg cacctcgggc    480
aattacggtc tgctcgacat cgcgcagtcc ctcaaatggg tacgcaagaa catcgcgaac    540
ttcggcggcg atgcggggcg ggtcacggtg tgggggcagt cgtcaggcgc cagcgccatc    600
accgcgttga tggtttcccc ccgatcggat ggcttgttcg accaggtcat cctcgacagt    660
ccgggcgcga tgcggcattg gaagacgctg gccgaggcgg agcaggacgg tatcgcgatc    720
gggtccgata tcggccagtt gcgcaagctg cccgcggacc aggttcccgt catccagaat    780 accgcggcg gcacggcggt tcgggcgctg gccgagcccc gggtgatcgg tcccgtgctg    840
gacggggtgg tgcttccgct tgaggagcgg cccgcattcg agcgggggca ggcgcgggcg    900
gtgccggtcc tggttgggta caacaccgat gaaggggcgt cgttcaccgg gggataccag    960
atccgtaccg tggatgccta tcgggcgtat ctcaaggatc cgaagatatt cgcggagttc   1020
ggcgacgagg ccttctccta ttacccggtc tccagcgata gcgaggtgca acgggcgatt   1080
tccgacagct ttggcgacaa ccagttcgtg ttcggcaccc ggggcattgc cagggcgatg   1140
gccgcgcagg ggcagccggt atatcgctat tggttccgca ggaagggtaa cggcggaacc   1200
ggcgcggacg ccgtgcatgg cgccgagttg ccctatgtcc gggccgacgc gaggctcgat   1260
gccgcgccgt acaccgcgga cgacgtgaaa ctgtcccgca tgatgaacga tgcctggttt   1320
cgcttcgtct cgaccggaga cccgaacggt ggcgaggtca cgaactggcc ccggtacgac   1380
acgcgctccg aaccggtata cgtcttcgac gcggcgacgg aaatcgtgaa cggtccgcgc   1440
aatgatcgat tggatttcat cggcagggtc gacgccgcgc tgaatccggt cccg         1494
```

FUMONISIN DEGRADING ENZYME FumDPS AND GENE AND USE THEREOF

FIELD OF THE INVENTION

The present invention relates to the field of genetic engineering, particularly to a fumonisin degrading enzyme FumDPS, gene and application thereof.

BACKGROUND OF THE INVENTION

Fumonisins (FB) are a water-soluble secondary metabolites produced by *Fusarium* spp. under specific conditions and are diesters composed of polyhydric alcohols and propionic tricarboxylic acids, with the main active functional groups of primary amines, tricarboxylic acids, hydroxyl groups and aliphatic skeletons, which are closely related to their toxic effects. It has been reported that fumonisin can cause renal tumor and liver cancer in rats, leukomalacia equina (ELEM), pulmonary edema (PPE) in pigs, and is closely related to the pathogenesis of human esophageal cancer. Up to now, 28 analogues of fumonisin have been found, which can be divided into four categories of FA, FB, FC and FP, wherein FB series mainly include fumonisins B1 (FB1), B2 (FB2) and B3 (FB3) in nature, wherein FB1 accounts for about 70% to 80% of the total amount in nature, is the most toxic and the most extensively polluted. Fumonisins can be removed by physical and chemical methods, wherein chemical methods have great limitations of introducing new chemicals and increasing the potential safety risks, in spite of reducing the content of FB1, which is prohibited to eliminate mycotoxins in the European Union, and physical method can remove a certain amount of fumonisin, but its requirements are hard to match and easily change the quality and flavor of food. The biodegradation of fumonisin has the advantages of mild reaction, strong specificity and wide application prospect.

The pollution of mycotoxins is increasing all over the world, which causes the waste of valuable food resources and is carcinogenic to human beings. Therefore, the research of enzymes for degrading mycotoxin can well prevent the contaminated food crops from producing the toxin and retrieve economic losses.

ORDER OF THE INVENTION

In order to degrade fumonisin by biodegradation method, the present invention provides fumonisin degrading enzyme FumDPS, gene and application thereof.

The order of the present invention is to provide a fumonisin degrading enzyme FumDPS.

Another order of the present invention is to provide a gene encoding said fumonisin degrading enzyme FumDPS.

Another order of the present invention is to provide a recombinant expression vector comprising said gene encoding fumonisin degrading enzyme FumDPS.

Another order of the present invention is to provide a recombinant strain comprising said gene encoding fumonisin degrading enzyme FumDPS.

Another order of the present invention is to provide a method for preparing the above fumonisin degrading enzyme FumDPS.

Another order of the present invention is to provide application of said fumonisin degrading enzyme FumDPS.

In a preferred embodiment of the present invention, said fumonisin degrading enzyme FumDPS comprises the amino acid sequence of SEQ ID No: 1 having 552 amino acids and one stop codon, and a signal peptide of 54 amino acids in N-terminal.

```
                                              SEQ ID No: 1
MHSLNSSMEHWSAMSERQSITVRRRLRIGGQVLCAALLGAAMAGCGSDGA

KAPEAGSPGGNPPGEPLPPGIARTSAGLVRGDVGEIVSFKGIPYARPPVG

DLRWRPPADAEPWEGVRDALAFGPACIQAGSRVQSEDCLTLNVWVPRESL

DRGEKLPVLVWVYGGSFVGGSGDPBAEGLARKGAVVVSMNYRVSTMGFMA

HPGLSAESPEGTSGNYGLLDIAQSLKWVRKNIANFGGDAGRVTVWGQSSG

ASAITALMVSPRSDGLFDQVILDSPGAMRHWKTLAEAEQDGIAIGSDIGQ

LRKLPADQVPVIQNTGGGTAVRALAEPRVIGPVLDGVVLPLEERPAFERG

QARAVPVLVGYNTDEGASFTGGYQIRTVDAYRAYLKDPKIFAEFGDEAFS

YYPVSSDSEVQRAISDSFGDNQFVFGTRGIARAMAAQGQPVYRYWFRRKG

NGGTGADAVHGAELPYVRADARLDAAPYTADDVKLSRMMNDAWFRFVSTG

DPNGGEVTNWPRYDTRSEPVYVFDAATEIVNGPRNDRLDFIGRVDAALNP

VP
```

Therefore, the theoretical molecular weight of mature FumDPS is 53.26 kDa and the mature FumDPS has the amino acid sequence of SEQ ID NO:2.

```
                                              SEQ ID NO: 2
AGSPGGNPPGEPLPPGIARTSAGLVRGDVGEIVSFKGIPYARPPVGDLRW

RPPADAEPWEGVRDALAFGPACIQAGSRVQSEDCLTLNVWVPRESLDRGE

KLPVLVWVYGGSFVGGSGDFEAEGLARKGAVVVSMNYRVSTMGFMAHPGL

SAESPEGTSGNYGLLDIAQSLKWVRKNIANFGGDAGRVTVWGQSSGASAI

TALMVSPRSDGLFDQVILDSPGAMRHWKTLAEAEQDGIAIGSDIGQLRKL

PADQVPVIQNTGGGTAVRALAEPRVIGPVLDGVVLPLEERPAFERGQARA

VPVLVGYNTDEGASFTGGYQIRTVDAYRAYLKDPKIFAEFGDEAFSYYPV

SSDSEVQRAISDSFGDNQFVFGTRGIARAMAAQGQPVYRYWFRRKGNGGT

GADAVHGAELPYVRADARLDAAPYTADDVKLSRMMNDAWFRFVSTGDPNG

GEVTNWPRYDTRSEPVYVIDAATEIVNGPRNDRLDFIGRVDAALNPVP
```

In a yet preferred embodiment of the present invention, the amino acid sequence of FumDPS has 90% to 99% consistency with the sequence of SEQ ID NO: 1, preferably 90%, 91%, 92%, 93%, 94%, 95%, 96%, 97%, 98%, or 99% consistency.

In a yet preferred embodiment of the present invention, the amino acid sequence of FumDPS has 90% to 99% consistency with the sequence of SEQ ID NO: 2, preferably 90%, 91%, 92%, 93%, 94%, 95%, 96%, 97%, 98%, or 99% consistency.

The present invention provides a gene encoding said fumonisin degrading enzyme FumDP, comprises a nucleotide sequence of SEQ ID NO:3.

```
                                              SEQ ID NO: 3
Atgcattccttaaactcgtcgatggagcattggtcggccatgtctgaacg ccagtccataaccgtgcgtcgccgcctgcgtatcggcggccaagtcctct
```

-continued

```
gcgccgcattgctgggcgctgccatggcgggatgcggcagcgatggcgcc aaggcccccgaggctggaagtcccggaggcaatccgccgggcgaacccct tccgcctggcattgcgcgtacctctgccggcctggtcaggggcgatgtgg gagagatcgtgtcatcaagggaatcccgtatgccaggccgcccgtcggcg acttgcggtggcgcccgccggccgatgccgaaccgtgggagggcgtgcgg gatgccaggcgttcggcccggcatgcatccaggccggctcgagggtccag agcgaagactgcctgacgctgaacgtctgggtaccgcgcgagtccctgga ccggggcgagaaactgccggtgctggtctgggtgtacggtggaagctagt cggcggctccggagacttcgaggccgaggggctggctcgcaaggggcgg tggtggtgtcgatgaactaccgcgtcagtacgatgggcttcatggcccac ccggggagtcggccgaatcgccggaaggcacctcgggcaattacggtctg ctcgacatcgcgcagtccctcaaatgggtacgcaagaacatcgcgaactt cggcggcgatgcggggcgggtcacggtgtgggggcagtcgtcaggcgcca gcgccatcaccgcgttgatggtaccccccgatcggatggcttgttcgacc aggtcatcctcgacagtccgggcgcgatgcggcattggaagacgctggcc gaggcggagcaggacggtatcgcgatcgggtccgatatcggccagagcgc aagctgcccgcggaccaggaccgtcatccagaataccggcggcggcacg gcggttcgggcgctggccgagccccgggtgatcggtcccgtgctggacgg ggtggtgcttccgcttgaggagcggcccgcattcgagcggggcaggcgc gggcggtgccggtcctggagggtacaacaccgatgaaggggcgtcgttca ccgggggataccagatccgtaccgtggatgcctatcgggcgtatctcaag gatccgaagatattcgcggagttcggcgacgaggccactcctattacccg gtctccagcgatagcgaggtgcaacgggcgataccgacagctaggcgaca accagttcgtgttcggcacccggggcattgccagggcgatggccgcgcag gggcagccggtatatcgctattggttccgcaggaagggtaacggcggaac cggcgcggacgccgtgcatggcgccgagagccctatgtccgggccgacgc gaggctcgatgccgcgccgtacaccgcggacgacgtgaaactgtcccgca tgatgaacgatgcctggatcgcttcgtctcgaccggagacccgaacggtg gcgaggtcacgaactggccccggtacgacacgcgctccgaaccggtatac gtatcgacgcggcgacggaaatcgtgaacggtccgcgcaatgatcgattg gatttcatcggcagggtcgacgccgcgctgaatccggtcccgtag
```

The present invention provides a gene encoding a mature fumonisin degrading enzyme FumDP, and comprises the nucleotide sequence of SEQ ID NO:4.

SEQ ID NO: 4
```
gctggaagtcccggaggcaatccgccgggcgaacccatccgcctggcatt gcgcgtacctctgccggcctggtcaggggcgatgtgggagagatcgtgta ttcaagggaatcccgtatgccaggccgcccgtcggcgacttgcggtggcg cccgccggccgatgccgaaccgtgggagggcgtgcgggatgccaggcgtt cggcccggcatgcatccaggccggctcgagggtccagagcgaagactgcc tgacgctgaacgtctgggtaccgcgcgagtccctggaccggggcgagaaa
```

```
ctgccggtgctggtctgggtgtacggtggaagctagtcggcggctccgga gacttcgaggccgaggggctggctcgcaaggggcggtggtggtgtcgat gaactaccgcgtcagtacgatgggcttcatggcccaccggggagtcggc cgaatcgccggaaggcacctcgggcaattacggtctgctcgacatcgcgc agtccctcaaatgggtacgcaagaacatcgcgaacttcggcggcgatgcg gggcgggtcacggtgtgggggcagtcgtcaggcgccagcgccatcaccgc gttgatggtaccccccgatcggatggcttgacgaccaggtcatcctcgac agtccgggcgcgatgcggcattggaagacgctggccgaggcggagcagga cggtatcgcgatcgggtccgatatcggccagagcgcaagctgcccgcgga ccaggaccgtcatccagaataccggcggcggcacggcggttcgggcgct ggccgagccccgggtgatcggtcccgtgctggacggggtggtgatccgct tgaggagcggcccgcattcgagcggggcaggcgcgggcggtgccggtcc tggagggtacaacaccgatgaaggggcgtcgttcaccggggggataccaga tccgtaccgtggatgcctatcgggcgtatctcaaggatccgaagatattc gcggagttcggcgacgaggccactcctattacccggtctccagcgatagc gaggtgcaacgggcgataccgacagctaggcgacaaccagttcgtgacgg cacccggggcattgccagggcgatggccgcgcaggggcagccggtatatc gctattggaccgcaggaagggtaacggcggaaccggcgcggacgccgtgc atggcgccgagagccctatgtccgggccgacgcgagctcgatgccgcgc cgtacaccgcggacgacgtgaaactgtcccgcatgatgaacgatgcctgg atcgcttcgtctcgaccggagacccgaacggtggcgaggtcacgaactgg ccccggtacgacacgcgctccgaaccggtatacgtatcgacgcggcgacg gaaatcgtgaacggtccgcgcaatgatcgattggatttcatcggcagggt cgacgccgcgctgaatccggtcccg
```

In a yet preferred embodiment of the present invention, the nucleotide sequence of said gene encoding said fumonisin degrading enzyme FumDPS has 90% to 99% consistency with the sequence of SEQ ID NO: 3, preferably 90%, 91%, 92%, 93%, 94%, 95%, 96%, 97%, 98%, or 99% consistency.

In a yet preferred embodiment of the present invention, the nucleotide sequence of said gene encoding said fumonisin degrading enzyme FumDPS has 90% to 99% consistency with the sequence of SEQ ID NO: 4, preferably 90%, 91%, 92%, 93%, 94%, 95%, 96%, 97%, 98%, or 99% consistency.

In a yet preferred embodiment of the present invention, the gene encoding said fumonisin degrading enzyme FumDPS is isolated and cloned by PCR method, and has the full length of 1659 bp as shown by DNA sequence analysis.

The fumonisin degrading enzyme FumDPS of the present invention has 45% identity of amino acid sequence with that of sphingosine box bacteria MTA 144, and is a new fumonisin degrading enzyme by BLASTting in GenBank.

The present invention provides a recombinant vector comprising the gene encoding said fumonisin degrading enzyme FumDPS, named pET28a (+)—FumDPS. The gene encoding said fumtoxin degrading enzyme of the present invention is inserted between the suitable restriction enzyme sites of the expression vector, so as to be operably connected with the expression regulation sequence. In the preferred embodiment of the present invention, it is preferred to insert the fumonisin degrading enzyme gene between the restriction site of EcoR I and Xho I of the plasmid pET28a (+), so that the nucleotide sequence is located downstream of T7 promoter and regulated by it, so as to obtain the recombinant *Escherichia coli* expression plasmid pET28a (+)-FumDPS.

The present invention also provides a recombinant strain containing said gene encoding said fumonisin degrading enzyme FumDPS, and said strain is preferably *Escherichia coli*.

The preparation method of fumonisin degrading enzyme FumDPS according to the present invention comprises the following steps of transforming the host cells with the recombinant vector containing the gene encoding the fumonisin degrading enzyme FumDPS to obtain the recombinant strain; cultivating the obtained recombinant strain to induce the expression of fumonisin degrading enzyme; and isolating and purifying the fumonisin degrading enzyme.

The preparation method of fumonisin degrading enzyme FumDPS according to the present invention, wherein said host cell preferably is *E. coli* cell, *Saccharomyces cerevisiae* cell or *Saccharomyces polymorpha* cell, and more preferably is *E. coli* BL21strain (DE3).

The present invention also provides an application of said fumonisin degrading enzyme FumDPS, especially in the degradation of fumonisin.

The fumonisin degrading enzyme of the present invention has the optimum temperature of 37° C., the optimum pH of 8 to 9, remains more than 60% of the activity in the range of pH 3-7, and has 100% of the degradation rate of FB1 at the optimum temperature and the optimum pH.

The present invention provides a fumonisin degrading enzyme with the excellent properties, which can be used to reduce the harm of fumonisin to animals and human health in agriculture, feed and food.

EMBODIMENT

Test Materials and Reagents
1. Strains and vectors: *E. coli* expression vector pET28a (+) and strain BL21 (DE3).
2. Medium:
    *E. coli* LB medium: 1% peptone, 0.5% yeast extract, and 1% NaCl, pH 7.0.

Example 1 Cloning of the Gene Encoding the Fumonisin Degrading Enzyme FumDPS of Decarboxylase Family The artificial nucleotide sequence of the coding region of the gene encoding the fumonisin degrading enzyme FumDPS was chemically synthesized, and was add with the restriction enzyme sites EcoR I and Xho I in its 5 'end and 3' end respectively.

Example 2 Preparation of Recombinant Fumonisin Degrading Enzyme FumDPS

The expression vector pET28a(+) and the gene encoding fumonisin degrading enzyme was digested with the restriction enzyme EcoR I and Xho I, respectively, and the obtained gene fragment encoding mature fumonisin degrading enzyme was connected with the expression vector pET28a (+) to obtain the recombinant plasmid pET28a(+)-FumDPS containing FumDPS which was transformed into strain *E. coli* BL21 (DE3) to obtain the recombinant strain *E. coli* BL21 (DE3)/FumDPSs.

The recombinant expression vector comprising the fumonisin degrading enzyme gene with signal peptide sequence was constructed by the same way.

Furthermore, the strain BL21 (DE3) comprising the recombinant plasmid was inoculated in 100 mL of LB medium, cultured by shaking at 37° C. and 220 rpm for 2 to 3 h, and add with IPTG in a final concentration of 1 mM when OD600 was 0.6 to 0.8, followed by inducing at 25° C. for 20 h, and collecting the cells by centrifugation at 4° C. The supernatant was collected after ultrasonic crushing and the protein was purified by nickel column. The results of SDS-PAGE showed that the recombinant fumonisin degrading enzyme was expressed in *E. coli* shown as shown by the lane 1 indicating the purified FumDPS of FIG. 1.

Example 3 Determination of the Properties of the Fumonisin Degrading Enzyme FumDPS The enzyme activity of the fumarotoxin degrading enzyme was detected by high performance liquid chromatography (HPLC) including the following steps of (1) preparing FB1 standard stock solution, wherein 1 mg of standard sample, was dissolve with 10 mL of acetonitrile and water in a ratio of 1:1, to obtain the standard solution in the concentration of 100 ug/mL, being stored at −20° C.

(2) preparing sample wherein 900 ul of the purified fumonisin degrading enzyme solution was added with 100 ul of FB1 standard stock solution to 10 ug/ml of the final concentration of FB1 followed by being cultured for 20 min at 37° C. and 220 rpm in dark. and (3) deriving the sample wherein 400 uL of acetonitrile water at the concentration of 50% was added to 100 uL of sample to obtain 500 uL of OPA derivatization solution which was mixed evenly for 30 s, and derived for 2 min followed by being loaded into the filter membrane to determine the activity of FumDPS by comparing the peak diagram with that of FB1 standard.

1. Determination of the Optimum Temperature of Fumonisin Degrading Enzyme

100 μL of FB1 as substrate was added with 900 μL of enzyme solution until the final concentration of 10 μg/mL to react for 20 min in citric acid disodium hydrogen phosphate buffer in pH7.0 at different temperatures, and then be inactivated by boiling for 10 min, followed by detecting after cooling to the room temperature and membrane filtration.

As shown in FIG. 2, the optimum temperature of enzyme FumDPS was 37° C.

2. Determination of the Optimum pH of Fumonisin Degrading Enzyme

The purified recombinant enzyme FumDPS was perform the enzymatic reaction to determine the optimum pH wherein the enzyme reacted with the substrate FB1 at the final concentration of 1 μg/mL min at 37° C. for 30 min in the different pH buffers, and boiled for 10 min followed by high performance liquid chromatography (HPLC), wherein the buffer gradients of the buffer solutions were 100 mM of citric acid disodium hydrogen phosphate from pH 3.0 to 8.0, 100 mM of Tris Hcl from pH 8.0 to 9.0, and 100 mM of glycine-NaOH from pH 9.0 to 12.0.

Figure 1:
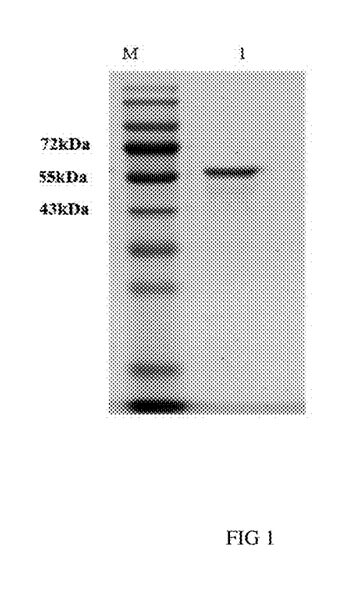
FIG. 1 shows the SDS-PAGE purification of the fumonisin degrading enzyme FumDPS of the present invention, in which M: protein marker; 1: fumonisin degrading enzyme FumDPS.
Figure 2:
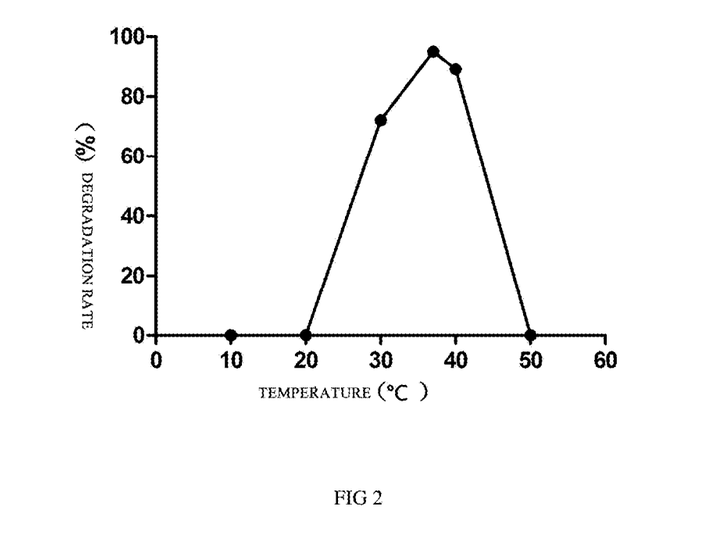
FIG. 2 shows the optimum temperature of the fumonisin degrading enzyme FumDPS of the present invention.
Figure 3:
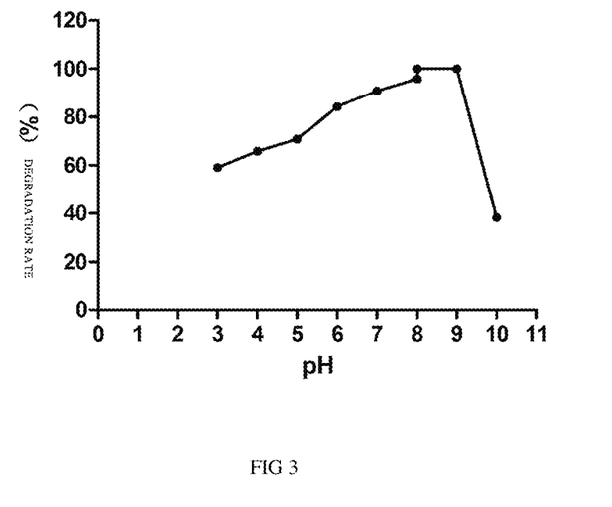
FIG. 3 shows the optimum pH of the fumonisin degrading enzyme FumDPS of the present invention.

As shown in FIG. 3, the optimum pH of FumDPS was between 8.0 and 9.0, and the enzyme FumDPS had a degradation rate more than 58% between pH 3.0 and 7.0.

The invention claimed is:

1. A method of degrading fumonisin, the method comprising contacting the fumonisin with a degrading enzyme FumDPS, wherein said fumonisin degrading enzyme FumDPS comprises the amino acid sequence of SEQ ID NO: 1 or SEQ ID NO: 2.

2. The method according to claim 1, wherein said fumonisin degrading enzyme FumDPS is encoded by gene comprising a nucleotide sequence of SEQ ID NO:3 or SEQ ID NO:4.

3. The method according to claim 1, wherein said fumonisin degrading enzyme FumDPS has an optimum temperature of 37° C. and the optimum pH of 8 to 9, retains more than 60% of activity in the range of pH 3 to 7, and has 100% of degradation rate of fumonisin B1 at optimum temperature and pH.

4. The method according to claim 1, wherein said fumonisin degrading enzyme FumDPS is being prepared by a method comprising transforming an isolated host cell with a DNA construct comprising a polynucleotide which comprises a nucleotide sequence encoding said fumonisin degrading enzyme FumDPS comprising the amino acid sequence of SEQ ID NO: 1 or SEQ ID NO: 2 to obtain a recombinant host cell; cultivating the recombinant host cell to produce the fumonisin degrading enzyme FumDPS; and recovering the fumonisin degrading enzyme FumDPS.

5. The method according to claim 4, wherein said isolated host cell is *Escherichia coli*.

* * * * *